(12) United States Patent
Weston

(10) Patent No.: US 9,744,818 B2
(45) Date of Patent: Aug. 29, 2017

(54) CIRCUMFERENTIAL ORIENTATION OF PIEZOELECTRIC DEVICE IN TIRE TO IMPROVE SIGNAL QUALITY

(71) Applicants: COMPAGNIE GENERALE DES ESTABLISSEMENTS MICHELIN, Clermont-Ferrand (FR); MICHELIN RECHERCHE et TECHNIQUE S.A., Granges-Paccot (CH)

(72) Inventor: David Alan Weston, Hendersonville, NC (US)

(73) Assignee: COMPAGNIE GENERALE DES ETABLISSEMENTS MICHELIN, Clermont-Ferrand (FR)

( * ) Notice: Subject to any disclaimer, the term of this patent is extended or adjusted under 35 U.S.C. 154(b) by 95 days.

(21) Appl. No.: 14/442,245

(22) PCT Filed: Nov. 20, 2012

(86) PCT No.: PCT/US2012/065996
§ 371 (c)(1),
(2) Date: May 12, 2015

(87) PCT Pub. No.: WO2014/081409
PCT Pub. Date: May 30, 2014

(65) Prior Publication Data
US 2015/0328942 A1    Nov. 19, 2015

(51) Int. Cl.
*B60C 23/04* (2006.01)
*B60C 23/20* (2006.01)
(Continued)

(52) U.S. Cl.
CPC ...... *B60C 23/0408* (2013.01); *B60C 23/0411* (2013.01); *B60C 23/0493* (2013.01);
(Continued)

(58) Field of Classification Search
CPC .................................................. B60C 23/0408
See application file for complete search history.

(56) References Cited

U.S. PATENT DOCUMENTS 7,040,154 B2    5/2006    Shaw
8,166,809 B2    5/2012    Weston
(Continued)

FOREIGN PATENT DOCUMENTS

WO    WO 2010/024819 A1    3/2010
WO    WO 2012/091719 A1    7/2012

OTHER PUBLICATIONS

PCT International Search Report for PCT/US2012/065996, dated Feb. 7, 2013.

*Primary Examiner* — Ryan Walsh
(74) *Attorney, Agent, or Firm* — Dority & Manning, P.A.

(57) ABSTRACT

An apparatus and method for monitoring parameters of a tire using a piezoelectric device is provided. The piezoelectric device is mounted as part of a tire mountable apparatus with a circumferential orientation in a tire such that that the direction defined by length of the piezoelectric device is generally aligned with the direction of rotation of the tire. This can lead to increased coupling of the piezoelectric device to changing circumferential tire shape as the piezoelectric device enters and exits the contact patch of the tire while at the same time reducing the coupling of the piezoelectric device to changing lateral tire shape. Contact patch entry and exit times from piezoelectric signals generated by the piezoelectric device can be more readily identified, leading to increased accuracy of tire parameters determined from the contact patch entry and exit times, such as tire revolution count, tire speed, and contact patch angle.

17 Claims, 5 Drawing Sheets

(51) Int. Cl.
*G01M 17/02* (2006.01)
*B60C 23/06* (2006.01)
(52) U.S. Cl.
CPC ............ *B60C 23/064* (2013.01); *B60C 23/20* (2013.01); *G01M 17/02* (2013.01)

(56) References Cited

U.S. PATENT DOCUMENTS

| | | |
|---|---|---|
| 8,324,788 B2 | 12/2012 | Kameda et al. |
| 2010/0147061 A1 | 6/2010 | Weston |
| 2010/0231403 A1 | 9/2010 | Bortolin |
| 2010/0269598 A1 | 10/2010 | Weston |
| 2011/0113876 A1 | 5/2011 | Kammann |
| 2011/0132649 A1* | 6/2011 | Weston ............... B60C 23/0411 174/260 |
| 2012/0038175 A1 | 2/2012 | Tang et al. |
| 2012/0043856 A1 | 2/2012 | Kameda et al. |

* cited by examiner

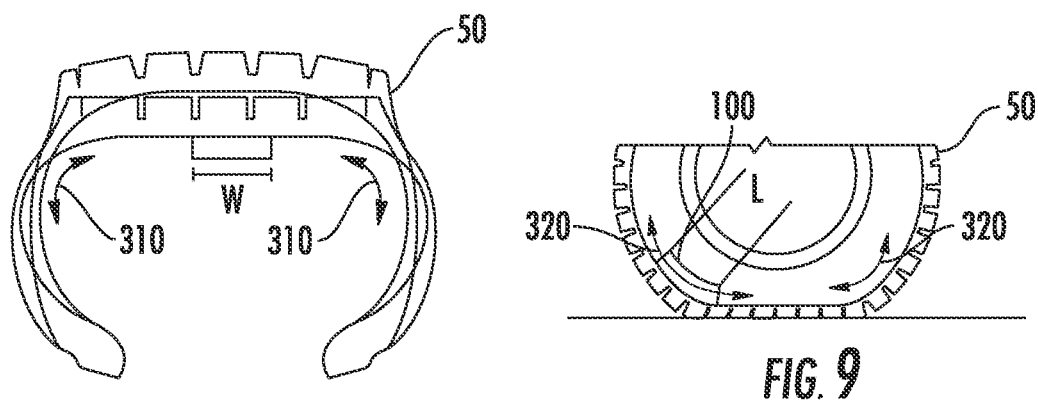
FIG. 8
FIG. 9
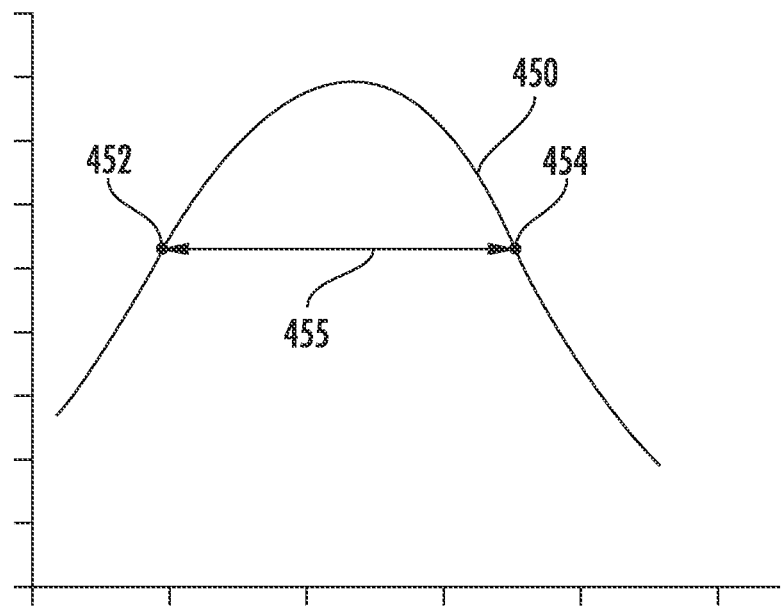
FIG. 10

CIRCUMFERENTIAL ORIENTATION OF PIEZOELECTRIC DEVICE IN TIRE TO IMPROVE SIGNAL QUALITY

FIELD OF THE INVENTION

The present disclosure relates generally to piezoelectric devices mountable to tires, and more particularly to arranging piezoelectric devices in tires to improve the nature of signal shape received from the piezoelectric device.

BACKGROUND OF THE INVENTION

The incorporation of electronic devices with tire structures has been shown to yield many practical advantages. Piezoelectric devices have been incorporated with tire patches to provide a power source for various sensors and other components of a tire mountable apparatus used to measure tire parameters. Piezoelectric devices have also been used to acquire data, such as piezoelectric signals indicative of the time-varying shape of a rolling tire at the location of the piezoelectric device. The piezoelectric signals can be analyzed to assess various parameters of a tire. Such information may be useful in tire monitoring and warning systems as well as in tire testing and design.

One exemplary structure for a piezoelectric device can include a substrate having one or more piezoelectric components, such as a power generation component and a signal generation component. The power generation component can provide energy upon flexure of the power generation component to power various components of a tire mountable apparatus, such as temperature and pressure transducers used to monitor temperature and pressure of a tire. The signal generation component can provide signals, such as piezoelectric waveforms, associated with flexure of the signal generation component induced by the time-varying shape of the rolling tire. The signals generated from the signal generation component can be analyzed, for instance, to count tire revolutions, to determine tire speed, and to identify the contact patch angle for the tire.

WO 2010/024819 discloses a tire mountable apparatus including a piezoelectric substrate that has length and width dimensions for providing enhanced endurance of the tire mountable apparatus. The piezoelectric substrate can be mounted in a tire with a lateral orientation such that a line perpendicular to the direction of the length of the piezoelectric substrate is aligned substantially in the direction of rotation of the tire so that strain on the tire mountable apparatus is essentially limited to one direction.

While lateral orientation of the tire mountable apparatus can provide increased durability, it can negatively affect the nature of the signal shape of piezoelectric signals generated by the piezoelectric device. In particular, in certain tires, such as high aspect ratio tires, the lateral orientation of the tire mountable apparatus provides increased coupling of the piezoelectric device with changing lateral tire shape at the edges of the contact patch. The increased coupling with changing lateral tire shape can lead to distortions in signal shape of the piezoelectric signal from the piezoelectric device. These distortions can reduce the ability to extract accurate information from the piezoelectric signal, such as contact patch entry and exit times, tire revolution count, tire speed, and contact patch angle.

SUMMARY OF THE INVENTION

Aspects and advantages of the invention will be set forth in part in the following description, or may be apparent from the description, or may be learned through practice of the invention.

One exemplary aspect of the present disclosure is directed to a method for monitoring one or more parameters of a tire. The method includes mounting a tire mountable apparatus to a tire. The tire mountable apparatus includes a piezoelectric device having at least one piezoelectric component. The piezoelectric device has a length L. The length L is the longest dimension of the piezoelectric device. The method further includes rotating the tire for one or more revolutions and obtaining a piezoelectric signal generated by the at least one piezoelectric component during rotation of the tire. The tire mountable apparatus is mounted to the tire so that the direction of the length L of the piezoelectric device is aligned within 20°, such as within 5°, of the direction of rotation of the tire.

Another exemplary aspect of the present disclosure is directed to a tire mountable apparatus mounted to a tire. The tire mountable apparatus includes a piezoelectric device having at least one piezoelectric component. The piezoelectric device has a length L and a width W. The length L is the longest dimension of the piezoelectric device. The tire mountable apparatus further includes a plurality of conductive terminals on the piezoelectric device. The plurality of conductive terminals are arranged in a generally linear relationship along a line that is within 20° of perpendicular to the direction defined by the length L of the piezoelectric device. The piezoelectric device is mounted to a central portion of a summit of the tire so that the direction of the length L of the piezoelectric device is aligned within 20°, such as within 5°, of the direction of rotation of the tire.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIGS. 7-9 depict the exemplary circumferential orientation of a tire mountable apparatus in a tire according to an exemplary embodiment of the present disclosure;

FIG. 10 depicts an exemplary piezoelectric signal obtained from a tire mountable apparatus mounted in a tire with circumferential orientation according to an exemplary embodiment of the present disclosure;

DETAILED DESCRIPTION

Figure 1:
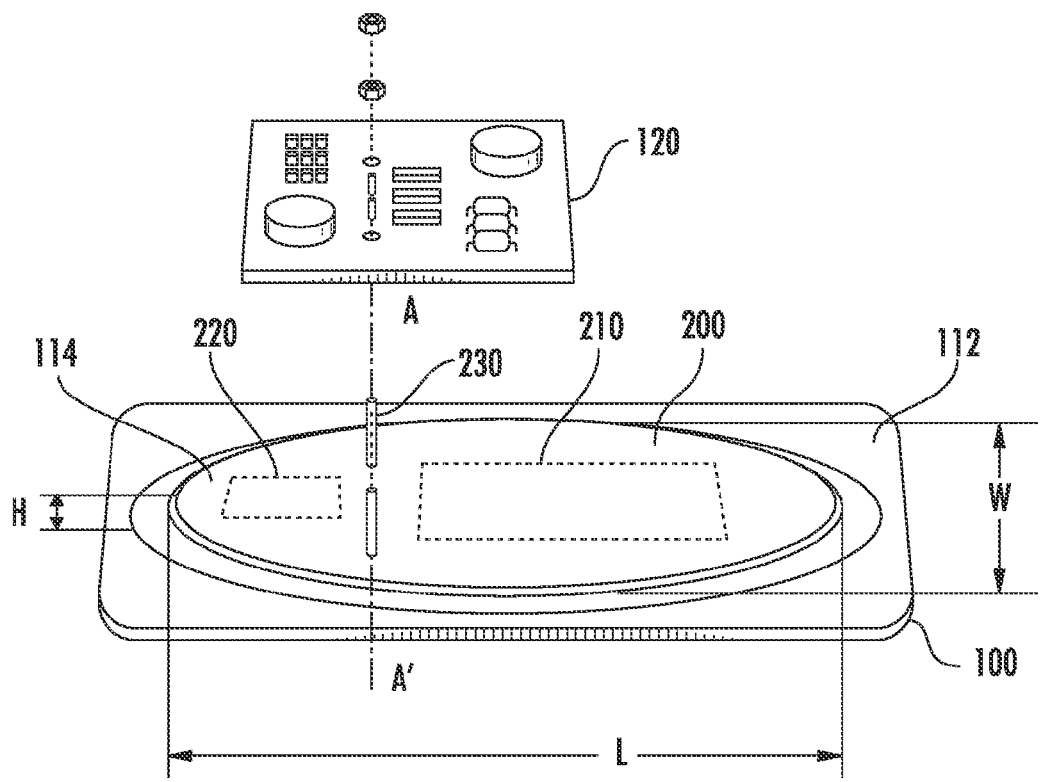
FIG. 1 depicts an exploded view of an exemplary tire mountable apparatus according to an exemplary embodiment of the present disclosure.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

Generally, the present disclosure is directed to mounting a piezoelectric device used as part of a tire mountable apparatus with a particular orientation in a tire to improve the nature of signal shape of piezoelectric signals generated by the piezoelectric device during tire rotation. In particular, a tire mountable apparatus can include a piezoelectric device having one or more piezoelectric components that are used to provide piezoelectric signals indicative of the time varying shape of the tire at the location of the piezoelectric device during rolling of the tire. These piezoelectric signals can be analyzed to assess various parameters of the tire. For instance, piezoelectric signals generated by the piezoelectric device can be analyzed to identify signal events in the piezoelectric signal attributable to the piezoelectric device passing through the contact patch (i.e. the portion of the tire circumference that contacts the ground surface) of the tire during tire rotation.

More particularly, as the piezoelectric device passes through the contact patch of the tire, the piezoelectric device can be subjected to increased flexure as the piezoelectric device enters and exits the contact patch. Signal events in the piezoelectric signal attributable to this increased flexure can be identified and used to identify contact patch entry and exit times. The contact patch entry and exit times can be used to determine various parameters, such as tire revolution count, tire speed, and contact patch angle of the tire. The contact patch angle of the tire can used in combination with other parameters of the tire, such as tire pressure, to identify or determine various tire load conditions during rolling.

According to particular aspects of the present disclosure, the tire mountable apparatus can be circumferentially oriented in a tire such that the direction defined by a length (i.e. the long dimension) of the piezoelectric device is aligned generally in the direction of rotation of the tire. For instance, the tire mountable apparatus can be mounted to the tire so that the direction of the length of the device is aligned within 20°, such as within 5°, of the direction of rotation of the tire. Aligning the tire mountable apparatus in this manner increases the mechanical coupling of the piezoelectric device with the changing circumferential tire shape as the tire mountable apparatus enters and exits the contact patch of the tire during tire rotation.

In addition, circumferential orientation of the piezoelectric device can also reduce mechanical coupling of the piezoelectric device to changing lateral tire shape as the tire enters and exits the contact patch. As a result, distortions affecting piezoelectric signal shape generated by the mechanical coupling of the piezoelectric device to changing lateral tire shape can be reduced. This can be particularly beneficial in high aspect ratio tires where distortions in piezoelectric signals generated by piezoelectric devices mounted with a lateral orientation can be significant.

The circumferential orientation of the tire mountable apparatus in a tire can lead to increased strain on the tire mountable apparatus, particularly when compared to lateral orientation of the tire mountable apparatus in the tire. However, the impact of circumferential orientation can be reduced by adjusting the design of various components of the tire mountable apparatus. For instance, the size and mass distribution of a printed circuit board mounted to the tire mountable apparatus can be adjusted to reduce the additional cyclic stresses applied to the substrate as a result of circumferential orientation.

Mounting a tire mountable apparatus with circumferential orientation in a tire according to exemplary aspects of the present disclosure leads to improved ability to obtain good measurement of contact patch entry and exit times as the piezoelectric device can be dominantly coupled with changing circumferential tire shape as opposed to changing lateral tire shape. This can lead to increased accuracy of tire parameters determined from the contact patch entry and exit times, such as tire revolution count, tire speed, and contact patch angle.

Referring now to the FIGS., exemplary embodiments of the present disclosure will now be discussed in detail. FIG. 1 depicts an exploded view of an exemplary tire mountable apparatus 100 (e.g. a tire patch) according to an exemplary embodiment of the present disclosure. The tire mountable apparatus 100 can be secured to a tire, such as the inner liner of a pneumatic tire, to monitor various parameters of the tire. While the present disclosure will be discussed with reference to mounting a tire mountable apparatus to a pneumatic tire, the tire mountable apparatus 100 can similarly be mounted to a non-pneumatic tire without deviating from the scope of the present disclosure.

As illustrated, the tire mountable apparatus 100 includes a piezoelectric device 200. The piezoelectric device 200 can be implemented as a substrate or can take any other suitable form, such as a film. The piezoelectric device 200 can have a length L and a width W. The length L is the longest dimension of the piezoelectric device 200. As illustrated, the width W of the piezoelectric device 200 is significantly less than the length L. For instance, the length L can be at least twice the width W. In this regard, the tire mountable apparatus can be considered a 1-D tire mountable apparatus 100 because the length L dimension is significantly larger than the width W dimension. As can be seen from FIG. 1, however, the 1-D tire mountable apparatus 100 actually has three dimensions.

While the present disclosure will be discussed with referenced to a 1-D tire mountable apparatus 100 for purposes of illustration and discussion, those of ordinary skill in the art will understand that the principles of the present disclosure are equally applicable to a tire mountable apparatus 100 having a piezoelectric device with other suitable dimensions. For instance, the tire mountable apparatus 100 can include a width W selected to reduce coupling of the tire mountable apparatus 100 with the changing lateral shape of the tire and a length L selected to provide sufficient coupling to the changing circumferential shape of the tire to obtain quality piezoelectric signals for identifying contact patch entry and exit times. For instance, the length and width dimensions can be selected such that the entire tire mountable apparatus 100 can be located in the substantially flat portion of the tire summit.

Referring to FIG. 1, the piezoelectric device 200 can be secured to an elastomeric patch 110 that includes a base portion 112 and a raised mesa portion 114 having a height H above the base portion 112 of the elastomeric patch 110. The elastomeric patch 110 can be formed from an elastomeric material, such as a rubber material normally employed as a sidewall material in the construction of pneumatic tires. In one example, the piezoelectric device 200 can be secured to the elastomeric patch 110 by coating an adhesive on the piezoelectric device 200, placing the piezoelectric device 200 in a specially designed mold design to accommodate the piezoelectric device 200, filling the remainder of the mold with the elastomeric material, and curing the patch 110.

As illustrated in FIG. 1, the piezoelectric device 200 includes a first piezoelectric component 210 and a second piezoelectric component 220. The first piezoelectric component 210 and the second piezoelectric component 220 can have any suitable shape and orientation within the piezoelectric device 200. For instance, the first piezoelectric component 210 and the second piezoelectric component 220 can have a rectangular shape, circular shape, square shape, trapezoidal shape, or any other suitable shape. The first piezoelectric component 210 can be a generator piezoelectric component that is used to harvest energy upon flexure of the first piezoelectric component 210. This energy can be used to power various components of the tire mountable apparatus 100. The second piezoelectric component 220 can be a signal/sensor piezoelectric component that is used to provide piezoelectric signals for analysis upon flexure of the second piezoelectric component 220. The piezoelectric signals provided by the second piezoelectric component 220 can be analyzed, for instance, to identify signal events corresponding to contact patch entry times and contact patch exit times. The contact patch entry and exit times can be used to determine various parameters of the tire as will be discussed in more detail below.

Figure 2:
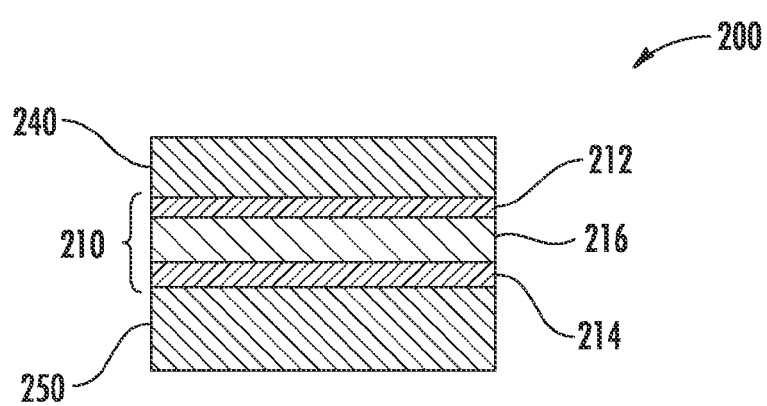
FIG. 2 depicts a cross-sectional view of an exemplary piezoelectric device according to an exemplary embodiment of the present disclosure.

Each of the piezoelectric components 210 and 220 can include a sandwich structure that includes a piezoelectric layer arranged between two conductive layers. FIG. 2 depicts a cross-sectional view of the piezoelectric component 210 of piezoelectric device 200. The piezoelectric component 210 includes a piezoelectric layer 216 arranged between a first conductive layer 212 on a first side of the piezoelectric layer 216 and a second conductive layer 214 on a second side of the piezoelectric layer 216. The piezoelectric layer 216 can be formed from any suitable piezoelectric material, such as a lead zirconate titanate (PZT) material. The conductive layers 212 and 214 can be formed from any suitable conductive material, such as copper.

As illustrated in FIG. 2, the piezoelectric component 210 is arranged between a first insulating layer 240 of the piezoelectric device 200 and a second insulating layer 250 of the piezoelectric device 200. Due to the strain the piezoelectric device 200 is subjected to during rotation of the tire, the first insulating layer 240 and the second insulating layer 250 can be formed from a relatively rigid material, such as the fire resistant material FR4. In one aspect, the second insulating layer 250 can be thicker than the insulating layer 240 to offset the piezoelectric layer 216 from a neutral plane of the piezoelectric device 200 to increase energy generation upon flexure of the piezoelectric component 210.

Referring back to FIG. 1, the tire mountable apparatus 100 can further include a printed circuit board 120. The printed circuit board 120 can include various components and devices, such as a microprocessor, a memory, temperature and/or pressure transducers, filter circuits, communication circuits, a battery, one or more antennas for communicating information to remote devices, and other devices. The generator piezoelectric component 210 can provide energy upon flexure of the piezoelectric component 210 to power the various components of the printed circuit board 120. The signal piezoelectric component 220 can provide piezoelectric signals associated with the flexure of the piezoelectric component 220 during tire rotation. These signals can be processed by the processor, stored in a memory provided on the printed circuit board 120 and/or transmitted to a remote device.

The printed circuit board 120 can be electrically coupled to the generator piezoelectric component 210 and the signal piezoelectric component 220 of the piezoelectric device 200 through a connection structure 230 that includes a plurality of conductive terminals. While four conductive terminals are depicted in FIG. 1, those of ordinary skill in the art, using the disclosures provided herein, will understand that more or fewer conductive terminals can be provided without deviating from the scope of the present disclosure. The connection structure 230 can include or be coupled to one or more conductive posts used to provide an electrical and mechanical connection between the printed circuit board 120 and the piezoelectric device 200. Two conductive posts are illustrated in FIG. 1. However, any number of conductive posts can be used without deviating from the scope of the present disclosure.

As shown in FIG. 2, the plurality of conductive terminals can be arranged in a generally linear relationship along a line A-A'. It should be appreciated that as used herein, the phrase "generally linear relationship" is intended to signify that there may be a variation in alignment from a perfect linear relationship. According to particular aspects of the present disclosure, the plurality of conductive terminals can be arranged in a generally linear relationship along a line A-A' that can be generally perpendicular (i.e. 90°) to the direction defined by the length L of the piezoelectric device 200. For instance, the plurality of conductive terminals can be arranged in a generally linear relationship along a line A-A' that is within 20°, such as within 5° of perpendicular to the direction defined by the length L of the piezoelectric device 200. Arranging the plurality of conductive terminals in this manner can reduce strain on the electrical and mechanical connection between the printed circuit board 120 and the piezoelectric device 200 during tire rotation.

The tire mountable apparatus 100 can be mounted to a tire and used to assess various parameters of the tire during tire rotation. As will be discussed in greater detail below, the piezoelectric component 220 of the tire mountable apparatus 100 will be subjected to increased mechanical strain when the tire mountable apparatus 100 enters and exits the contact patch of the tire during tire rotation. The strain induced onto the tire mountable apparatus 100 as the tire mountable apparatus 100 passes through the contact patch will cause the piezoelectric component 220 to generate a piezoelectric signal with signal events (e.g. inflection points) corresponding to entry and exit of the contact patch. The piezoelectric signal can be analyzed, for instance, to identify the signal events corresponding to contact patch entry times $t_{cpEntry}$ and contact patch exit times $t_{cpExit}$.

Various measurements can be performed based on the signal events corresponding to contact patch entry times $t_{cpEntry}$ and contact patch exit times $t_{cpExit}$. For instance, the number of tire revolutions can be determined by incrementing a counter every time a contact patch exit $t_{cpExit}$ (or contact patch entry $t_{cpEntry}$) occurs. As another example, tire speed as understood by $t_{rev}$ can be determined by identifying the time difference between contact patch exit times (e.g. $t_{rev}=t_{cpExit(n)}-t_{cpEntry(n-1)}$) or by identifying the time difference between contact patch entry times (e.g. $t_{rev}=t_{cpEntry(n)}-t_{cpEntry(n-1)}$). As still another example, contact patch angle can be determined based on the following:

$$cp_{angle} = \frac{t_{cpExit} - t_{cpEntry}}{t_{rev}}$$

Contact patch angle can be useful in determining various parameters of a tire, such as tire load. For instance, contact patch angle can be used in combination with tire parameters, such as tire pressure, to identify tire load while rolling.

Figure 3:
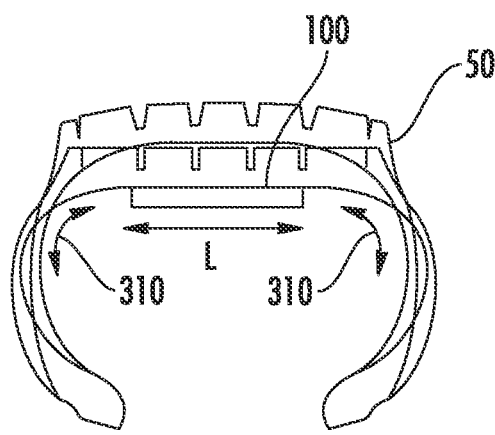
FIG. 3 depicts a representation of changing lateral tire shape for a contact patch of an exemplary tire.
Figure 4:
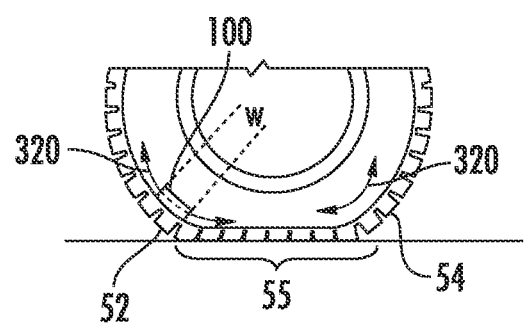
FIG. 4 depicts a representation of changing circumferential tire shape for a contact patch of an exemplary tire.

As will be understood with reference to FIGS. 3 and 4, a tire mountable apparatus 100 including a piezoelectric device can be subjected to mechanical strain along two axes when the tire mountable apparatus 100 enters and exits the contact patch during tire rotation. FIG. 3 representatively illustrates, in overlay, representations for comparison of transverse profiles at top of rotation (opposite of contact patch) and at entry of the contact patch of an exemplary tire 50 to which the tire mountable apparatus 100 can be mounted. As shown, the tire mountable apparatus 100 can be subjected to lateral strain 310 in the lateral axis as a result of changing lateral tire shape when the tire mountable apparatus 100 enters the contact patch.

FIG. 4 representatively illustrates variations in the circumferential radius of curvature for an exemplary tire 50. As shown, there are substantial variations in circumferential radius of curvature for the tire 50 at the entry point 52 and exit point 54 of the contact patch 55 of the tire. As shown, the tire mountable apparatus 100 can be subjected to circumferential strain 320 in the circumferential axis as a result of changing circumferential tire shape when the tire mountable apparatus 100 enters and exits the contact patch.

Figure 5:
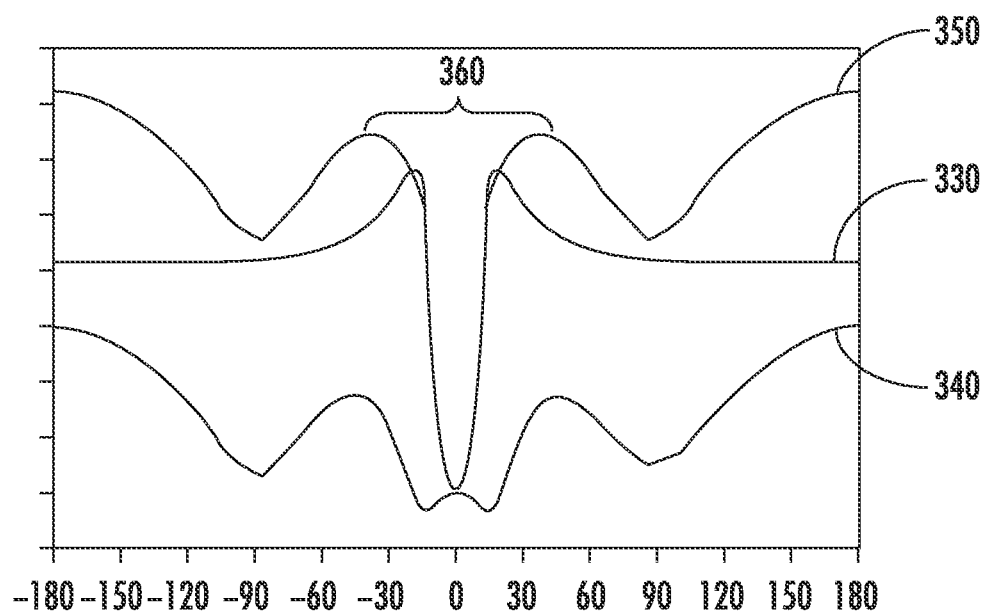
FIG. 5 depicts a graphical representation of lateral and circumferential surface curvature of an exemplary tire.

FIG. 5 graphically depicts the curvature of tire at various circumferential positions of the tire during tire rotation. FIG. 5 plots circumferential angular position of the tire along the abscissa and tire curvature (defined as 1/radius of the tire) along the ordinate. Curve 330 depicts curvature of the tire along the lateral axis. Curve 340 depicts curvature of the tire along the circumferential axis. Curve 350 depicts the composite curvature of the tire attributable to both the curvature along the lateral axis and curvature along the lateral axis. The portions of the curves 330, 340, and 350 designated by 360 are attributable to the contact patch of the tire. As demonstrated in FIG. 5, the changing curvature of the tire at the entry and exit of the contact patch is dominated by the changing circumferential curvature of the tire. Thus, to facilitate identification of signal events in a piezoelectric signal corresponding contact patch entry and exit times, it can desirable for the tire mountable apparatus 100 to be dominantly coupled to the changing circumferential curvature of the tire. This can be accomplished by mounting the tire mountable apparatus 100 with a circumferential orientation as will be discussed in detail below.

Referring back to FIGS. 3 and 4, the tire mountable apparatus 100 is mounted with a lateral orientation in the tire 50 as is known in the art such that the length L of the tire mountable apparatus 100 is aligned in a direction generally perpendicular to the direction of rotation of the tire 50. This lateral orientation can reduce strain on the tire mountable apparatus 100 by limiting strain on the tire mountable apparatus 100 to roughly one-dimension, namely the short dimension of the tire mountable device 100. However, as shown in FIG. 3, the lateral orientation of the tire mountable apparatus 100 results in increased mechanical coupling of the tire mountable device 100 to lateral strain 310 resulting from changing lateral shape of the tire 50 due to proximity of portions of the tire mountable apparatus 100 to the lateral edges of the tire 50. This is particularly true for high aspect ratio tires, such as tires having an aspect ratio of 0.75 or greater.

In addition, as shown FIG. 4, the shorter dimension W of the tire mountable apparatus 100 is aligned in the circumferential direction of rotation of the tire 50. This can result in reduced mechanical coupling of the tire mountable apparatus 100 to changing circumferential tire shape. However, as demonstrated in FIG. 5, changing circumferential tire shape is the best indicator of contact patch entry and contact patch exit. Thus, lateral orientation of the tire mountable apparatus 100 as illustrated in FIGS. 3 and 4 can result in reduced quality piezoelectric signals that make it difficult to identify signal events corresponding to contact patch entry and exit times.

Figure 6:
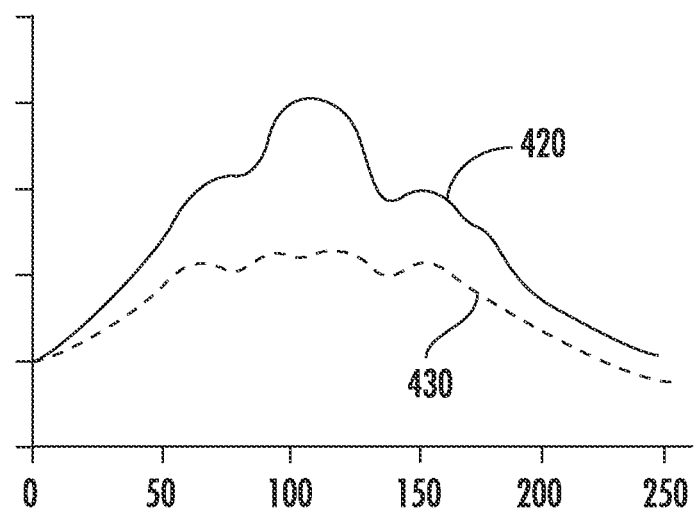
FIG. 6 depicts exemplary piezoelectric signals obtained from a tire mountable apparatus mounted with a lateral orientation in a tire.

For example, FIG. 6 depicts exemplary piezoelectric signals 420 and 430 obtained from a tire mountable device with lateral orientation. FIG. 6 plots time along the abscissa and the amplitude of the piezoelectric signal along the ordinate. The signal 420 was generated by a piezoelectric device having a lateral orientation in a tire, such as the orientation shown in FIGS. 3 and 4. The signal 420 was generated for a tire rotating at 35 kph having a pressure of 9 bar and loaded with 2000 kg. The signal 430 was also generated by a piezoelectric device having a lateral orientation in a tire, such as the orientation shown in FIG. 3 and FIG. 4. The signal 430 was generated for a tire rotating at 35 kph having a pressure of 11 bar and loaded with 5000 kg. As demonstrated, the piezoelectric signals 420 and 430 have many distortions that can make it difficult to identify signal events (e.g. inflection points) corresponding to contact patch entry and exit times. In addition, as load increases (e.g. from 2000 kg to 5000 kg) the shape of the piezoelectric signal can change drastically.

Figure 7:
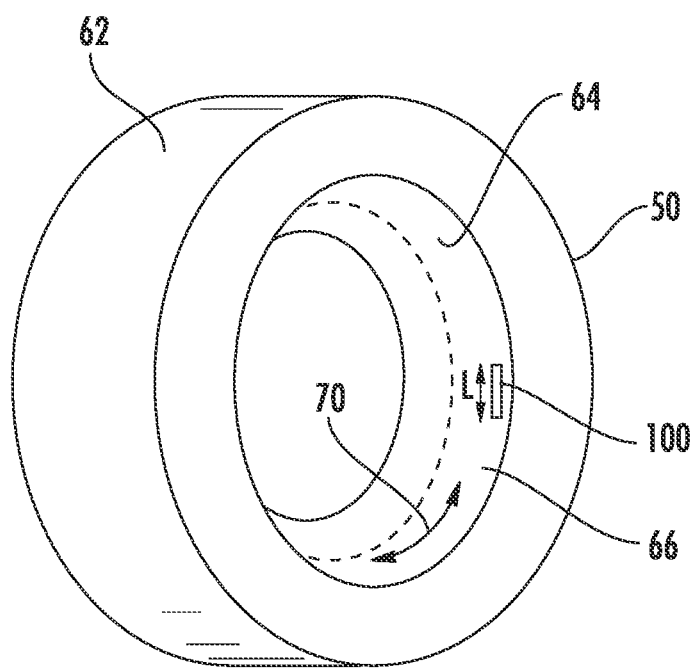

To increase the signal quality of piezoelectric signals generated by the tire mountable apparatus 100, aspects of the present disclosure are directed to mounting the tire mountable apparatus 100 in a tire with a circumferential orientation. FIG. 7 depicts the circumferential orientation of a tire mountable apparatus 100 in a tire 50 according to an exemplary embodiment of the present disclosure. The tire 50 includes a tread portion 62 as well as an inner wall 64. The tire mountable apparatus 100 is mounted to a central portion of a tire summit 66. The tire mountable apparatus 100 is arranged such that the direction defined by the length L of the tire mountable apparatus 100 is within 20°, such as within 5°, of the direction of rotation of the tire. The direction of rotation of the tire is generally represented by arrows 70.

While circumferential orientation subjects the tire mountable apparatus 100 to greater strain, the circumferential orientation of the tire mountable apparatus 100 provides increased mechanical coupling in the circumferential axis to the circumferential changing shape of the tire while at the same time reducing mechanical coupling in the lateral axis with the lateral changing shape of the tire.

This can be understood with reference to FIGS. 8 and 9. As shown in FIG. 8, the mountable apparatus 100 is mounted in the tire 50 such that the direction defined by the length L of the tire mountable apparatus 100 is generally aligned with the direction of rotation of the tire 50. This results in the shorter dimension W of the tire mountable apparatus extending between the sidewalls of the tire 50. The tire mountable apparatus 100 is located in the tire 50 such that tire mountable apparatus 100 is located in a substantially flat portion of the summit of an inner wall of the tire 50. As a result, the tire mountable apparatus 100 is further removed from the changing lateral shape of the tire 50 as the tire enters and exits the contact patch, reducing the impact of lateral strain 310 on the tire mountable apparatus 100. This can be particularly significant in high aspect ratio tires, such as tires having an aspect ratio of greater than 0.75 where the width of the tire 50 is relatively narrow.

FIG. 9 illustrates that the long dimension L of the tire mountable apparatus 100 is generally aligned in the direction of rotation of the tire 50. This results in increased coupling of the tire mountable apparatus 100 to the circumferential strain 320 caused by changing circumferential tire shape as the tire mountable apparatus 100 enters and exits the contact patch. The increased coupling results from the larger dimension of the tire mountable apparatus being exposed to the circumferential strain 320. The increased coupling of the tire mountable apparatus 100 to the changing circumferential shape of the tire 50 can result in a piezoelectric signal with clearer signal events corresponding to contact patch entry and exit times. In addition, energy harvested by the tire mountable apparatus 100, such as by the generator piezoelectric component 210 of the tire mountable apparatus 100, can be increased. For instance, up to three times the energy can be harvested from a piezoelectric device with circumferential orientation when compared to a piezoelectric device with similar length dimensions mounted with a lateral orientation in the tire.

FIG. 10 depicts an exemplary piezoelectric signal 450 generated from a piezoelectric device mounted with circumferential orientation in a tire according to exemplary aspects of the present disclosure. FIG. 10 plots time along the abscissa and the amplitude of the piezoelectric signal 450 along the ordinate. The signal 450 can be generated by a piezoelectric device having a circumferential orientation in a tire, such as the orientation shown in FIGS. 7-9. The signal 450 was generated for a tire rotating at 35 kph having a pressure of 9 bar and loaded with 2000 kg. The signal 450 has significantly reduced distortion when compared to the piezoelectric signal 420 of FIG. 6 generated under similar circumstances by a piezoelectric device with lateral orientation. In addition, the signal 450 has clear signal events that can be used to identify contact patch entry and exit times. More particularly, inflection point 452 can correspond to contact patch entry and inflection point 454 can correspond to contact patch exit. Contact patch angle 455 can be representatively illustrated as the difference 455 between inflection point 454 and inflection point 452.

Improved coupling of a tire mountable apparatus 100 can additionally be obtained by selecting the dimensions of the tire mountable apparatus 100 to reduce coupling of the tire mountable apparatus to changing lateral tire shape while maintaining sufficient coupling with changing circumferential tire shape. For instance, the tire mountable apparatus 100 can include a width W selected to reduce coupling of the tire mountable apparatus 100 with the changing lateral shape of the tire and a length L selected to provide sufficient coupling to the changing circumferential shape of the tire to obtain quality piezoelectric signals for identifying contact patch entry and exit times. In one particular implementation, the length L and width W dimensions can be substantially equal with the size of the length L and width W dimensions being selected such that coupling of the tire mountable apparatus to changing lateral tire shape is reduced while sufficient coupling of the tire mountable apparatus to changing circumferential tire is maintained.

As discussed above, mounting the tire mountable apparatus 100 with a circumferential orientation in a tire can result in increased strain on the tire mountable apparatus 100. The tire mountable apparatus 100 can be designed to accommodate the additional stress. As one example, the size and mass distribution of the printed circuit board mounted to the tire mountable apparatus 100 can be designed to accommodate additional cyclic stresses resulting from circumferential orientation of the tire mountable apparatus 100 to a tire.

Figure 11:
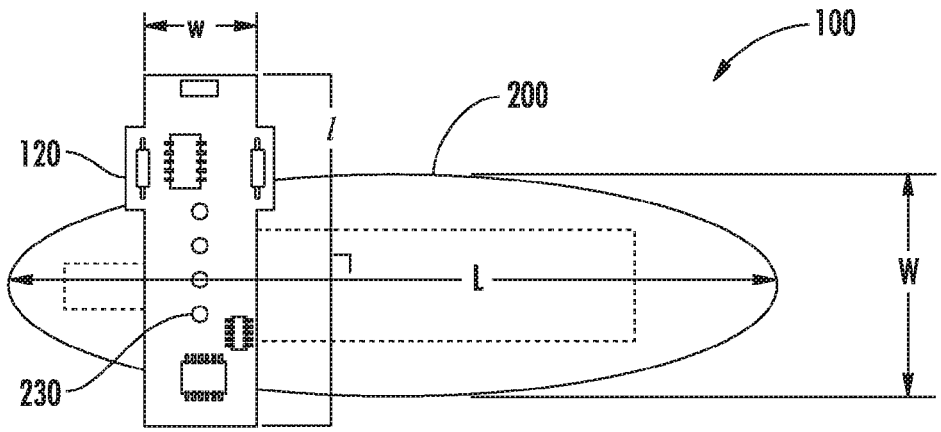
FIG. 11 depicts an exemplary arrangement of a circuit board relative to a piezoelectric device in a tire mountable apparatus according to an exemplary embodiment of the present disclosure.

For example, FIG. 11 depicts a plan view of an exemplary circuit board 120 mounted to the piezoelectric device 200 of a tire mountable apparatus 100 using a connection structure 230. The printed circuit board 120 has a length l and a width w. The length l is the longest dimension of the printed circuit board 120. The printed circuit board 120 is secured to the plurality of conductive terminals of the piezoelectric device 200 such that the length l of the printed circuit board is aligned within 20° of perpendicular to the length L of the piezoelectric device 200. This allows causes the shorter dimension w of the printed circuit board 120 to be centered about the connection structure 230, reducing the moment applied to the connection structure 230 during rotation. In this manner, the tire mountable apparatus 100 can more readily accommodate the additional cyclic stresses caused by circumferential orientation of the tire mountable apparatus 100 in a tire. Other suitable modifications can be made to accommodate the additional strain on the tire mountable apparatus as a result of circumferential orientation. For instance, the tire mountable apparatus 100 can include a shortened length L to increase the durability of the tire mountable apparatus.

Figure 12:
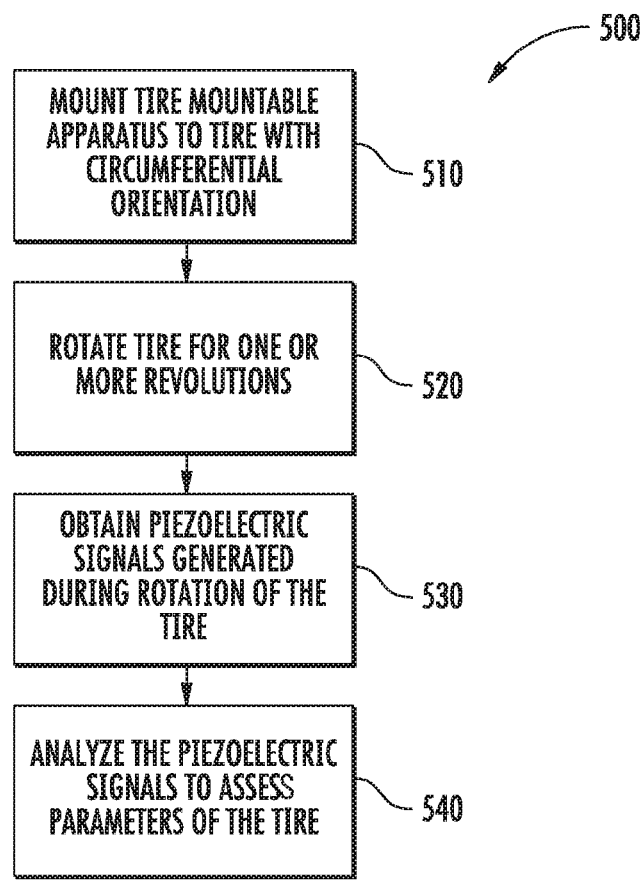
FIG. 12 depicts a flow diagram of an exemplary method according to an exemplary embodiment of the present disclosure.

FIG. 12 depicts an exemplary method (500) of monitoring one or more parameters of a tire according to an exemplary embodiment of the present disclosure. The method can be implemented using any tire mountable apparatus including a piezoelectric device, such as the tire mountable apparatus 100 of FIG. 1. In addition, although FIG. 12 depicts steps performed in a particular order for purposes of illustration and discussion, the methods discussed herein are not limited to any particular order or arrangement. One skilled in the art, using the disclosures provided herein, will appreciate that various steps of the methods can be omitted, rearranged, combined and/or adapted in various ways.

At (510), the method includes mounting a tire mountable apparatus to a tire with circumferential orientation. In particular, the tire mountable apparatus can be mounted to the central portion of the tire summit (e.g. as illustrated in FIG. 8) such that the direction defined by the length (long dimension) L of the piezoelectric device of the tire mountable apparatus is within 20°, such as within 5°, of the direction of rotation of the tire. Exemplary circumferential orientation of a tire mountable apparatus is depicted in FIGS. 7-9.

Referring back to FIG. 12, the method includes rotating the tire (520) and obtaining piezoelectric signals generated by a piezoelectric component of the tire mountable apparatus during rotation of the tire (530). For instance, the piezoelectric signals can be obtained by receiving the signals at a processing device mounted on a printed circuit board of the tire mountable apparatus and/or storing the signals in a memory mounted on the printed circuit board for later analysis.

At (540), the method can include analyzing the piezoelectric signals to assess one or more parameters of the tire. For instance, the piezoelectric signals can be analyzed to identify signal events corresponding to contact patch entry and contact patch exit times. Mounting the tire mountable apparatus in a tire with circumferential orientation can improve mechanical coupling of the tire mountable apparatus with changing circumferential tire shape during entry and exit of the contact patch, facilitating the identification of signal events corresponding to contact patch entry and contact patch exit times. The contact patch entry and exit times can be used to identify various parameters of the tire. For instance, as discussed above, the contact patch entry and exit times can be used to determine tire revolution count, tire speed, and contact patch angle of the tire.

While the present subject matter has been described in detail with respect to specific exemplary embodiments and methods thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art using the teachings disclosed herein.

What is claimed is:

1. A method for monitoring one or more parameters of a tire, comprising:
   mounting a tire mountable apparatus to a tire, the tire mountable apparatus comprising a piezoelectric device having at least one piezoelectric component, the piezoelectric device having length L, the length L being the longest dimension of the piezoelectric device; the tire mountable apparatus comprising a plurality of conductive terminals arranged on the piezoelectric device in a generally linear relationship along a line that is within 20° of perpendicular to the direction defined by the length L of the piezoelectric device; the tire mountable apparatus further comprising a printed circuit board secured to the plurality of conductive terminals, the printed circuit board having a length, the length being the longest dimension of the printed circuit board;
   rotating the tire for one or more revolutions; and
   obtaining a piezoelectric signal generated by the at least one piezoelectric component during rotation of the tire;
   wherein the tire mountable apparatus is mounted to the tire so that the direction of the length L of the piezoelectric device is aligned within 20° of the direction of rotation of the tire;
   wherein the printed circuit board is secured to the plurality of conductive terminals such that the length of the printed circuit board is aligned within 20° of perpendicular to the direction defined by the length L of the piezoelectric device.

2. The method of claim 1, wherein the tire mountable apparatus is mounted to the tire so that the direction of the length L of the piezoelectric device is aligned within 5° of the direction of rotation of the tire.

3. The method of claim 1, wherein the plurality of conductive terminals are arranged in a generally linear relationship along a line that is within 5° of perpendicular to the direction defined by the length L of the piezoelectric device.

4. The method of claim 1, wherein the piezoelectric device has a width W, the length L being at least twice the width W of the piezoelectric device.

5. The method of claim 1, wherein mounting the tire mountable apparatus to a tire comprises mounting the tire mountable apparatus to a central portion of a summit of an inner wall of the tire.

6. The method of claim 1, wherein the method further comprises analyzing the piezoelectric signal to assess one or more parameters of the tire.

7. The method of claim 6, wherein analyzing the piezoelectric signal to assess one or more tire parameters of the tire comprises analyzing the signal to identify a contact patch entry time and a contact patch exit time.

8. The method of claim 7, wherein analyzing the piezoelectric signal further comprises identifying a contact patch angle for the tire based on the contact patch entry time and the contact patch exit time for the tire.

9. The method of claim 1, wherein the at least one piezoelectric component comprises a first piezoelectric component and a second piezoelectric component, the first piezoelectric component being a generator component and the second piezoelectric component being a signal generating component.

10. The method of claim 1, wherein the at least one piezoelectric component comprises a piezoelectric layer arranged between first and second conductive layers.

11. The method of claim 1, wherein the tire mountable apparatus comprises an elastomeric patch, the elastomeric patch comprising a base portion and a mesa portion, the piezoelectric device being secured to the mesa portion.

12. The method of claim 1, wherein the tire mountable apparatus is mounted such that the tire mountable apparatus is located in a substantially flat portion of the summit of an inner wall of the tire.

13. A tire and tire mountable apparatus mounted to the tire, comprising:
   a piezoelectric device having at least one piezoelectric component, the piezoelectric device having a length L and a width W, the length L being the longest dimension of the piezoelectric device;
   a plurality of conductive terminals on the piezoelectric device, the plurality of conductive terminals arranged in a generally linear relationship along a line that is within 20° of perpendicular to the direction defined by the length L of the piezoelectric device; and
   a printed circuit board secured to the plurality of conductive terminals, the printed circuit board having a length, the length being the longest dimension of the printed circuit board;
   wherein the piezoelectric device is mounted to a central portion of a summit of the tire so that the direction of the length L of the piezoelectric device is aligned within 20° of the direction of rotation of the tire;
   wherein the printed circuit board is secured to the plurality of conductive terminals such that the direction defined by the length of the printed circuit board is aligned within 20° of perpendicular to the direction defined by the length L of the piezoelectric device.

14. The tire and tire mountable apparatus of claim 13, wherein the tire mountable apparatus further comprises an elastomeric patch, the elastomeric patch comprising a base portion and a mesa portion, the piezoelectric device being secured to the mesa portion.

15. The tire and tire mountable apparatus of claim 13, wherein the at least one piezoelectric component comprises a first piezoelectric component and a second piezoelectric component, the first piezoelectric component being a generator component and the second piezoelectric component being a signal generating component.

16. The tire and tire mountable apparatus of claim 13, wherein the tire mountable apparatus is mounted to a tire such that the tire mountable apparatus is located in a substantially flat portion of the summit of an inner wall of the tire.

17. The tire and tire mountable apparatus of claim 13, wherein the at least one piezoelectric component is arranged between a first insulating layer and a second insulating layer, the at least one piezoelectric component comprising a piezoelectric layer arranged between a first conductive layer and a second conductive layer.

* * * * *